(12) United States Patent
Yang

(10) Patent No.: US 10,572,436 B2
(45) Date of Patent: Feb. 25, 2020

(54) APPARATUS AND METHOD FOR MULTI-MASTER SOLUTION ON MDIO COMMUNICATION BUS

(71) Applicant: Honeywell International Inc., Morristown, NJ (US)

(72) Inventor: Zhi Yang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 270 days.

(21) Appl. No.: 14/717,137

(22) Filed: May 20, 2015

(65) Prior Publication Data

US 2016/0342565 A1 Nov. 24, 2016

(51) Int. Cl.
  *G06F 13/42* (2006.01)
  *G06F 13/40* (2006.01)
  *G06F 13/364* (2006.01)

(52) U.S. Cl.
  CPC ........ *G06F 13/4291* (2013.01); *G06F 13/364* (2013.01); *G06F 13/4072* (2013.01)

(58) Field of Classification Search
  CPC . G06F 13/4291; G06F 13/364; G06F 13/4072
  See application file for complete search history.

(56) References Cited

U.S. PATENT DOCUMENTS

| 6,085,258 A | 7/2000 | Dreyer et al. |
| 6,385,669 B1 | 5/2002 | Creedon et al. |
| 8,391,300 B1* | 3/2013 | Dropps ............... H04L 49/3054 370/351 |
| 2004/0059852 A1* | 3/2004 | Sun ..................... G06F 13/4291 710/110 |
| 2007/0101043 A1* | 5/2007 | Herman ............. G06F 13/4004 710/315 |

(Continued)

FOREIGN PATENT DOCUMENTS

KR 10-1361502 B1 2/2014

OTHER PUBLICATIONS

"Part 3: Carrier Sense Multiple Access with Collision Detection (CSMA/CD) access method and Physical Layer specifications,"IEEE Standard for Information Technology networks—Specific requirements, pp. 1, 38-51 (Year: 2008).*

(Continued)

*Primary Examiner* — Tim T Vo
*Assistant Examiner* — Herve Iradukunda

(57) ABSTRACT

A method is provided. The method includes receiving, at a first device, a request to transfer data over a Management Data Input/Output (MDIO) communication bus. The first device is configured to generate a first Management Data Clock (MDC) signal. The method also includes determining whether a second MDC signal from a second device is present on the communication bus. The method further includes in response to determining that the second MDC signal is not present on the communication bus, transmitting the first MDC signal and at least part of a Management Data Input/Output (MDIO) frame over the communication bus. The method includes in response to determining that the second MDC signal is present on the communication bus, refraining from transmitting the first MDC signal and at least the part of the MDIO frame over the communication bus.

16 Claims, 5 Drawing Sheets

(56) References Cited

U.S. PATENT DOCUMENTS

| | | | |
|---|---|---|---|
| 2010/0153601 A1* | 6/2010 | Lin | G06F 13/376 710/110 |
| 2014/0164647 A1* | 6/2014 | Lee | G06F 13/385 710/4 |
| 2015/0030336 A1 | 1/2015 | Tanaka | |

OTHER PUBLICATIONS

International Searching Authority, "Notification of Transmittal of the International Search Report and the Written Opinion of the International Searching Authority, or the Declaration," International Application No. PCT/US2016/030673, dated Aug. 12, 2016, 5 pages, publisher International Application Division Korean Intellectual Property Office, Daejeon, Republic of Korea.

International Searching Authority, "Written Opinion of the International Searching Authority," International Application No. PCT/US2016/030673, dated Aug. 12, 2016, 6 pages, publisher International Application Division Korean Intellectual Property Office, Daejeon, Republic of Korea.

\* cited by examiner

_US 10,572,436 B2_

APPARATUS AND METHOD FOR MULTI-MASTER SOLUTION ON MDIO COMMUNICATION BUS

TECHNICAL FIELD

This disclosure relates generally to data communications. More specifically, this disclosure relates to an apparatus and method for a multi-master solution on a Management Data Input/Output (MDIO) communication bus.

BACKGROUND

A Management Data Input/Output (MDIO) interface is a serial bus defined as part of the IEEE 802.3 standard related to wired Ethernet devices. An MDIO interface is also known as a Serial Management Interface (SMI) or a Media Independent Interface Management (MIIM). MDIO interfaces are routinely used to transport data between different devices over serial data connections.

Physical layer (PHY) management interfaces often use an Ethernet bus so that a media access control (MAC) device (such as master device) can read and write control and status registers of one or more devices connected to the bus. PHY management interfaces also often use an Ethernet bus so that a MAC device can read and write control status registers of Ethernet switches, which are used to configure the PHY devices and Ethernet switches before operation. In addition, PHY management interfaces often use an Ethernet bus so that a MAC device can monitor link status during operation.

SUMMARY

This disclosure provides an apparatus and method for a multi-master solution on a Management Data Input/Output (MDIO) communication bus.

In a first embodiment, a method is provided. The method includes receiving, at a first device, a request to transfer data over a Management Data Input/Output (MDIO) communication bus. The first device is configured to generate a first Management Data Clock (MDC) signal. The method also includes determining whether a second MDC signal from a second device is present on the communication bus. The method further includes in response to determining that the second MDC signal is not present on the communication bus, transmitting the first MDC signal and at least part of a Management Data Input/Output (MDIO) frame over the communication bus. The method includes in response to determining that the second MDC signal is present on the communication bus, refraining from transmitting the first MDC signal and at least the part of the MDIO frame over the communication bus.

In a second embodiment, an apparatus is provided. The apparatus includes a first device. The first device includes a clock generator configured to generate a first Management Data Clock (MDC) signal. The first device also includes a clock detector configured to detect a second MDC signal from a second device on a communication bus. The first device further includes a control module. The control module is configured to receive a request to transfer data over a Management Data Input/Output (MDIO) communication bus. The control module is also configured to in response to an indication that the second MDC signal is not present on the communication bus, initiate transmission of the first MDC signal and at least part of a Management Data Input/ Output (MDIO) frame over the communication bus. The control module is further configured to in response to determining that the second MDC signal is present on the communication bus, refrain from initiating transmission of the first MDC signal and at least the part of the MDIO frame over the communication bus.

In a third embodiment, a non-transitory computer readable medium embodying a computer program is provided. The computer program includes instructions that when executed cause at least one processing device of a first device to receive a request to transfer data over a Management Data Input/Output (MDIO) communication bus. The first device is configured to generate a first Management Data Clock (MDC) signal. The computer program also includes instructions that when executed cause at least one processing device of a first device to in response to an indication that a second MDC signal from a second device is not present on the communication bus, initiate transmission of the first MDC signal and at least part of a Management Data Input/Output (MDIO) frame over the communication bus. The computer program further includes instructions that when executed cause at least one processing device of a first device to in response to an indication that the second MDC signal from the second device is present on the communication bus, refrain from initiating transmission of the first MDC signal and at least the part of the MDIO frame over the communication bus.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

A conventional Management Data Input/Output (MDIO) interface generally supports two signals: a Management Data Clock (MDC) signal and an MDIO signal. The MDC signal is typically driven by a media access control (MAC) device and is distributed to one or more physical layer (PHY) devices in communication with the MAC device via a bus. The MDIO signal is typically a bidirectional signal and is used to transport data over the bus between the MAC device and the PHY device(s). For example, a PHY device can drive the MDIO signal to provide data to the MAC device as part of a read operation conducted by the MAC device. In conventional MDIO interfaces, only a single master device (the MAC device) can be used to communicate with the PHY devices over the bus.

Figure 1:
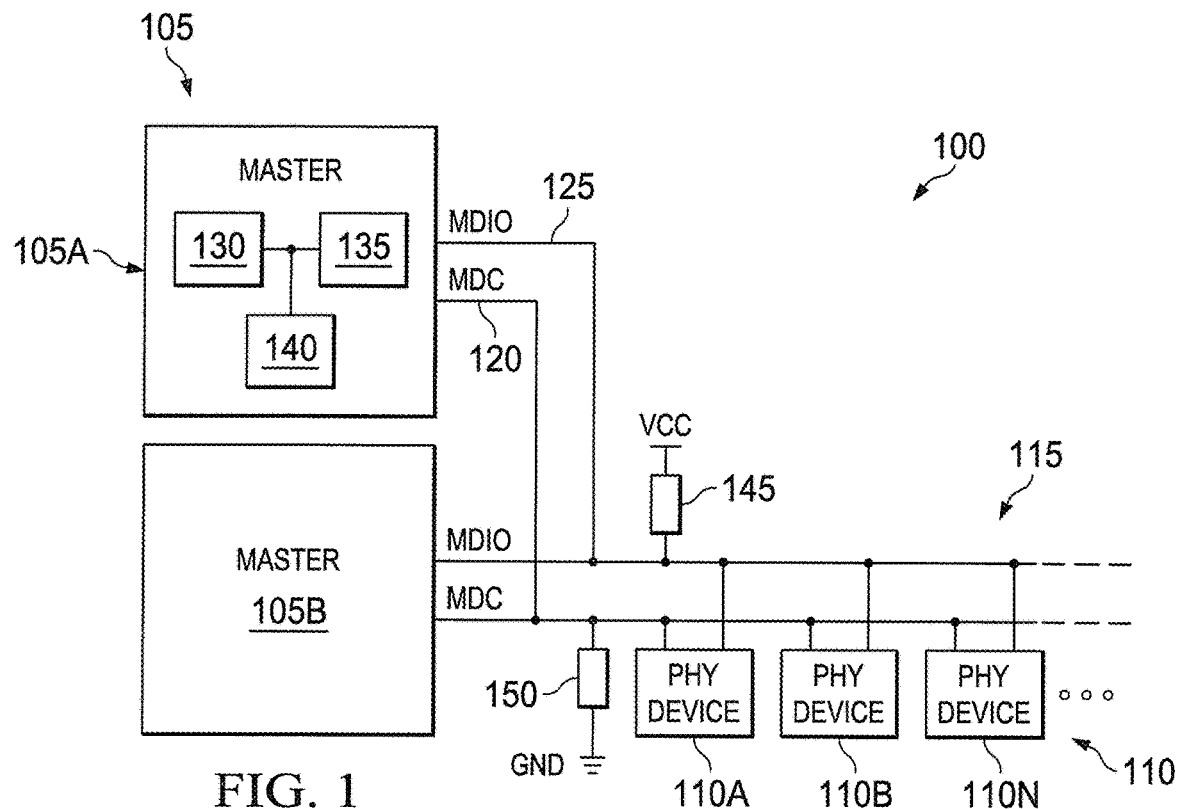
FIG. 1 illustrates an example bus system supporting multiple master devices in communication with one or more devices according to this disclosure.

FIG. 1 illustrates an example bus system 100 supporting multiple master devices in communication with one or more devices according to this disclosure. As shown in FIG. 1, the system 100 includes multiple master devices 105A-105B (collectively referred to as "master devices 105"). The master devices 105 communicate with one or more PHY devices 110A-110N (collectively referred to as "PHY devices 110") via a communication bus 115. Each of the master devices 105 is configured to control the PHY devices 110. The communication bus 115 includes an MDC line 120 and an MDIO line 125, which form an MDIO interface.

Each master device 105 generally represents any suitable computing device or other device configured to communicate over an MDIO interface and to control or interact with one or more PHY devices. For example, each master device 105 could include at least one processing device 130, at least one memory 135, and at least one network interface 140. Each processing device 130 could represent a microprocessor, microcontroller, digital signal processor (DSP), field programmable gate array (FPGA), application specific integrated circuit (ASIC), or discrete logic. Each memory 135 could represent a volatile or non-volatile storage and retrieval device, such as a random access memory or Flash memory. Each network interface 140 could represent an Ethernet interface or other interface configured to support an MDIO interface. Note that while "master devices" are described here, each device 105 could denote any type of MAC device for implementation in a bus system. Each PHY device 110 generally represents any suitable computing device or other devices configured to communicate over an MDIO interface and to interact with one or more master devices. For instance, each PHY device 110 could represent a computing device, a sensor, an actuator, or other device that provides data to and/or receives data from at least one master device.

Because multiple master devices 105 communicate with the PHY devices 110 via the bus 115, MDC signals from the master devices 105 would conflict on the MDC line 120 if more than one master device 105 transmits over the MDC line 120 at the same time. As described below, to help avoid this problem, each master device 105 only transmits data and outputs an MDC signal when the bus 115 is idle. In other words, only one of the master devices 105 transmits data and outputs an MDC signal over the bus 115 at any one time. Moreover, MDC signals in conventional MDIO interfaces are "output only" from the perspective of a MAC device. In the system 100 of FIG. 1, the MDC line 120 supports the use of bi-directional signals. When no data transfer is occurring by a master device 105, the MDC pin of that master device 105 is set as an input and is used to detect the bus state of the MDIO line 125. This allows each master device 105 to use the MDC line 120 to detect if and when another master device 105 is currently using the bus 115.

The bus 115 is coupled to two resistors: a pull-up resistor 145 communicatively coupled to the MDIO line 125 and a pull-down resistor 150 communicatively coupled to the MDC line 120. The two resistors set default states on the MDIO line 125 and the MDC line 120. For example, when no MDC signal is present on the MDC line 120, the pull-down resistor 150 sets low on the MDC line 120. When the pull-down resistor 150 is set low on the MDC line 120 or when no signal is present on the MDIO line 125, the pull-up resistor 145 is set high the MDIO line 125.

As an example, assume the master device 105A receives a command to transfer data through the bus 115 to one or more of the PHY devices 110. The master device 105A uses the MDC input to detect if an MDC signal is present on the MDC line 120. If the master device 105A detects that an MDC signal is present on the MDC line 120 (such as from the master device 105B), the master device 105A determines that the bus 115 is currently in use by another master device and refrains from transmitting data over the bus 115. In this case, the master device 105A waits until an MDC signal is no longer detected on the MDC line 120. When the master device 105A does not detect that an MDC signal is present on the MDC line 120, the master device 105A outputs an MDC signal over the MDC line 120 and a preamble over the MDIO line 125 to occupy the bus 115. Because other master devices 105 (such as the master device 105B) operate in the same or similar manner as the master device 105A, the other master devices 105 will not attempt to use the bus 115 while the master device 105A is transmitting data over the bus 115.

Although FIG. 1 illustrates one example of a bus system 100 supporting multiple master devices in communication with one or more devices, various changes may be made to FIG. 1. For example, various components in FIG. 1 could be combined, subdivided, or omitted and additional components could be added according to particular needs. Also, the numbers of master devices, PHY devices, buses, and signal lines shown in FIG. 1 are for illustration only. In addition, while shown and described as being used with an Ethernet bus, the multi-master configuration disclosed in this patent document could be used with other types of communication buses.

Figure 2:
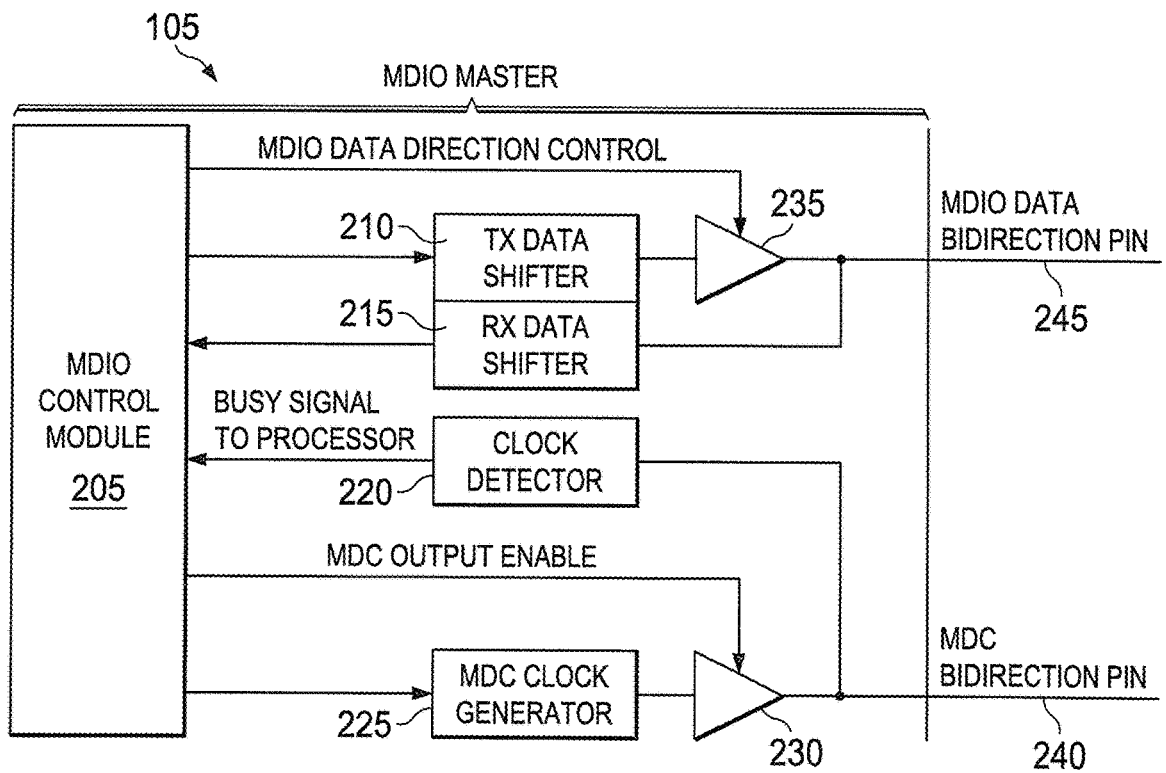
FIG. 2 illustrates an example master device according to this disclosure.

FIG. 2 illustrates an example master device 105 according to this disclosure. The master device 105 could denote either or both of the master devices 105A-105B shown in FIG. 1. For ease of explanation, the master device 105 in FIG. 2 is described as being used in the system 100 of FIG. 1. However, the master device 105 could be used in any other suitable system.

As shown in FIG. 2, the master device 105 includes an MDIO control module 205, a transmit (TX) data shifter 210, a receive (RX) data shifter 215, a clock detector 220, and an MDC clock signal generator 225. The MDIO control module 205 generally controls the operation of the master device 105 to support communications over an MDIO interface. For example, the control module 205 can control two drivers 230-235 to thereby control data transmissions through the MDC and MDIO lines 120-125, respectively. More specifically, the control module 205 controls the driver 230 to thereby control whether a clock signal from the signal generator 225 is output over the MDC line 120 via an MDC pin 240. The control module 205 also controls the driver 235 to thereby control whether data from the transmit data shifter 210 is output over the MDIO line 125 via an MDIO pin 245. The control module 205 includes any suitable structure for controlling one or more operations or components of a master device, such as one or more processing devices (including microprocessors, microcontrollers, DSPs, FPGAs, ASICs, or discrete logic).

The transmit data shifter 210 receives outgoing data from the control module 205 and provides the data serially over the pin 245 via the driver 235. The receive data shifter 215 receives serial incoming data via the pin 245 and provides the data to the control module 205. Data received from the control module 205 could have any suitable form, such as serial data or parallel data that is converted into serial format by the data shifter 210. Similarly, data sent to the control module 205 could have any suitable form, such as serial data or parallel data that is converted into parallel format by the data shifter 215. Each data shifter 210-215 includes any suitable structure for transmitting or receiving serial data.

The clock detector 220 is configured to sense whether an MDC signal is received via the pin 240. If so, the clock detector 220 sends an indication to the control module 205 that the bus 115 is currently "busy," meaning another master device is currently transmitting MDC and MDIO signals over the bus 115. The clock detector 220 includes any suitable structure for detecting the presence of a clock signal. The MDC clock signal generator 225 is configured to generate an MDC signal and to provide the MDC signal to the MDC line 120 via the pin 240. The MDC clock signal generator 225 includes any suitable structure for generating a clock signal.

Each driver 230-235 is configured to selectively allow passage of outgoing signals onto the lines 120-125, respectively, via the pins 240-245, respectively. Each driver 230-235 includes any suitable structure for selectively allowing or blocking passage of a signal, such as a tri-state driver. Each pin 240-245 includes any suitable conductive structure configured to be electrically coupled to an external signal line, such as an MDC or MDIO signal line.

As noted above, one master device 105 can refrain from transmitting data over the bus 115 while another master device is using the bus 115. To detect if the bus 115 is currently occupied, the clock detector 220 receives any signals present on the MDC line 120 via the pin 240 and determines if any valid MDC signals are sensed. During this time, the drivers 230-235 can be configured to block outgoing transmissions from the master device 105. As a result, the pins 240-245 are configured as input pins during this time, and the master device 105 is able to receive incoming signals via the MDC and MDIO lines 120-125.

When the clock detector 220 detects that the bus 115 is not in use (because no valid MDC signals are received via the pin 240), the drivers 230-235 can be configured to allow outgoing transmissions from the master device 105. As a result, the pins 240-245 can both be configured as output pins during this time, and the master device 105 is able to transmit both (i) a clock signal from the signal generator 225 over the MDC line 120 and (ii) data from the shifter 210 over the MDIO line 125. Note that during this time, the driver 235 can also be selectively configured to block outgoing transmissions from the master device 105 so that the master device 105 is able to receive incoming transmissions over the MDIO line 125, where the incoming transmissions are directed to the shifter 215 for data recovery. This allows the master device 105 to configure the pin 245 as either an input pin or an output pin as needed so that the master device 105 can engage in bi-directional communications during the time that the master device 105 "owns" the bus 115.

Although FIG. 2 illustrates one example of a master device 105, various changes may be made to FIG. 2. For example, various components in FIG. 2 could be combined, subdivided, or omitted and additional components could be added according to particular needs. Also, while shown and described as being used with an Ethernet bus, the multi-master configuration disclosed in this patent document could be used with other types of communication buses.

Figure 3:
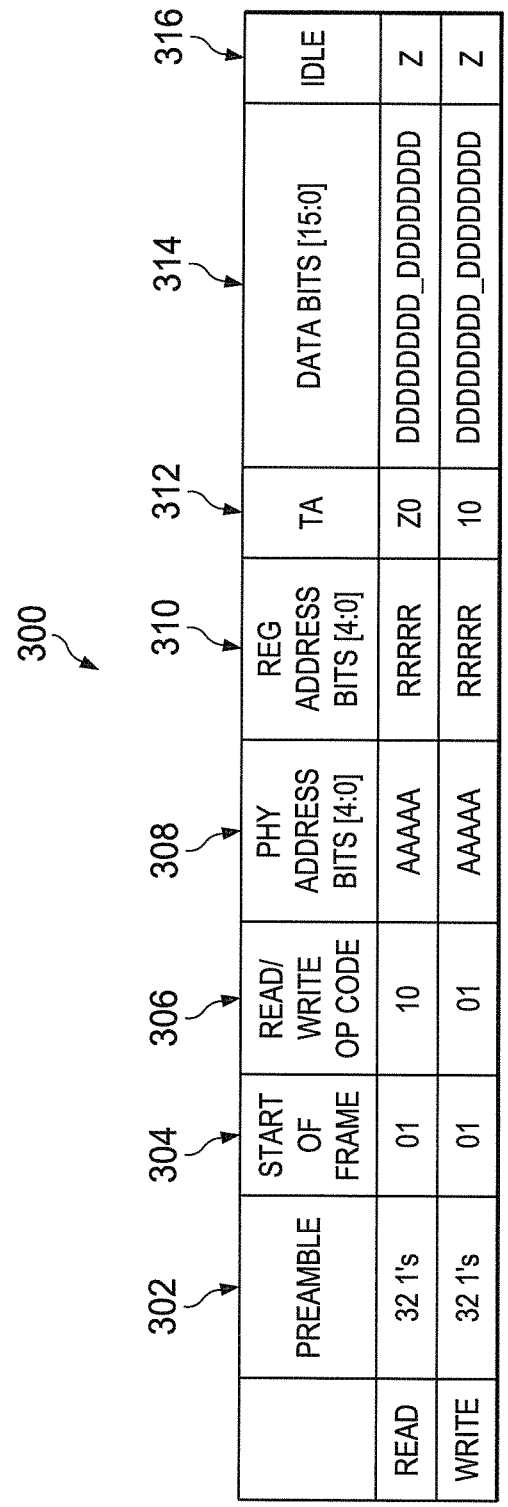
FIG. 3 illustrates an example table defining write and read signals used by master devices according to this disclosure.

FIG. 3 illustrates an example table 300 defining write and read signals used by master devices according to this disclosure. The table 300 could, for example, define write and read signals used by the master devices 105A-105B in FIG. 1. However, the write and read signals could be used in any other suitable system.

As shown in FIG. 3, the table 300 contains entries 302-316 that define the contents of write and read signals transmitted to or from a master device 105 over a bus 115. The entry 302 defines a 32-bit preamble that is used by a master device 105 to initiate a write or read command, and the entry 304 defines a 2-bit indicator used by the master device 105 to identify the start of a frame. These values are used by the master device 105 to indicate that a write or read command is being sent to at least one PHY device. The entry 306 defines a 2-bit code used by the master device 105 to indicate whether the command is a write or read comment.

The entry 308 defines a 5-bit address that is used by the master device 105 to identify a specific PHY device, and the entry 310 defines a 5-bit address that is used by the master device 105 to identify a specific data register or other memory location within the identified PHY device. These two values are used by the master device 105 to identify the specific memory location in the specific PHY device that will be read from or written to during the command.

The entry 312 defines TA bits. TA bits are 'Z0' when read registers. This means that the master device's MDIO pin is changed to input Hi-Z from an output mode. The following '0' is the read response from the PHY device 110. TA bits are set to '10' when write registers.

The entry 314 defines a 16-bit field in which data is either sent from the master device 105 to a PHY device (during a write operation) or sent from the PHY device to the master device 105 (during a read operation).

The entry 316 provides an indication when the master device 105 is finished transferring all bits of a management frame. The master devices' MDIO pin is changed to input Hi-Z when the master device 105 is finished transferring all bits of the management frame. It should be noted that Hi-Z refers to a high impedance state of the signal.

Although FIG. 3 illustrates one example of a table 300 defining write and read signals used by master devices, various changes may be made to FIG. 3. For example, each field in the write and read signals could include any suitable number of bits. Also, the signals defined in the table 300 are for illustration only, and other signals could be used to perform write, read, or other operations over the bus 115. In general, a wide variety of signaling is possible over a bus, and FIG. 3 does not limit the scope of this disclosure to a particular signaling protocol.

Figure 4A:
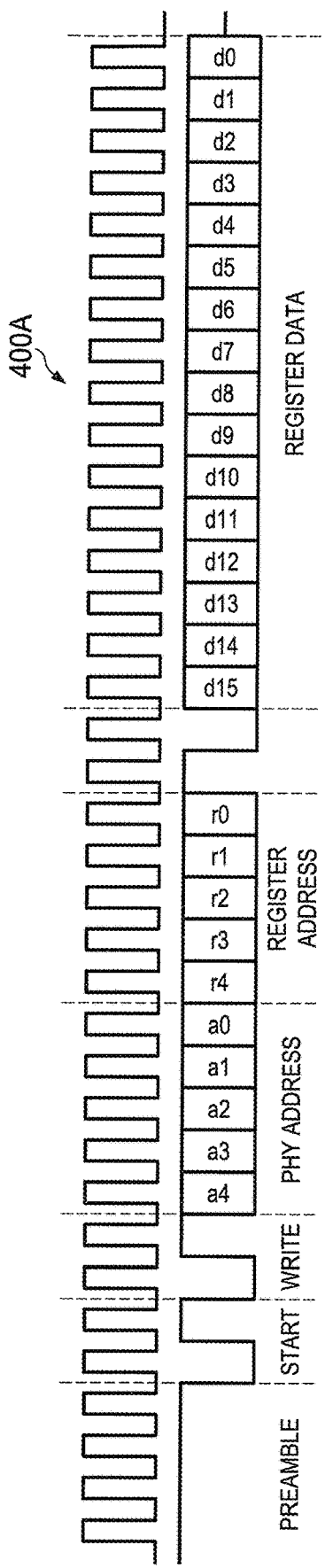
FIGS. 4A and 4B illustrate example write and read signals used by master devices according to his disclosure.
Figure 4B:
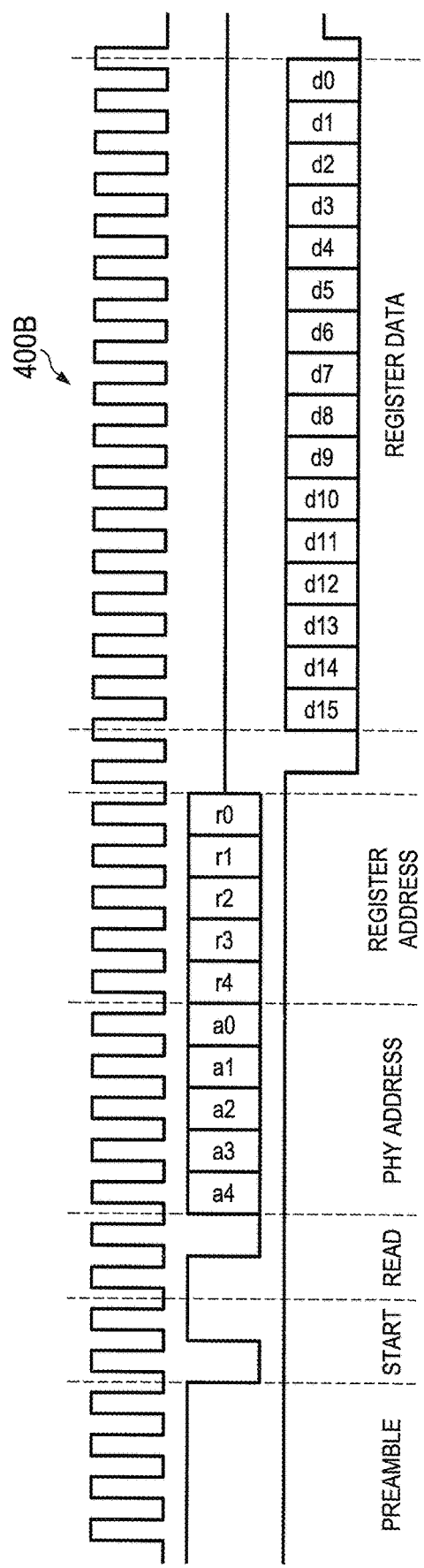

FIGS. 4A and 4B illustrate example write and read signals 400A-400B used by master devices according to his disclosure. The signals 400A-400B could, for example, be used by the master devices 105A-105B in FIG. 1. However, the write and read signals 400A-400B could be used in any other suitable system. Also, the write and read signals 400A-400B here follow the definitions provided in the table 300 of FIG. 3, although other write and read signals could be used.

Before a register access, PHY devices generally require a preamble of 32 ones to be sent by the MAC on the MDIO line. The access consists of 16 control bits, followed by 16 data bits. The control bits consist of 2 start bits, 2 access type bits (read or write), the PHY address (5 bits) and the register address (5 bits). During a write command, the MAC provides address and data. For a read command, the PHY takes over the bus at the end of the address bits transmission to supply the MAC with the register data requested. When the MAC drives the MDIO line, the MAC guarantees a stable value 10 ns (setup time) before the rising edge of the clock MDC. Further, MDIO remains stable 10 ns (hold time) after the rising edge of MDC. When the PHY drives the MDIO line, the PHY provides the MDIO signal between 0 and 300 ns after the rising edge of the clock. Hence, with a minimum clock period of 400 ns (2.5 MHz maximum clock rate) the MAC safely samples MDIO during the second half of the low cycle of the clock.

Although FIGS. 4A and 4B illustrate examples of write and read signals 400A-400B used by master devices, various changes may be made to FIGS. 4A and 4B. For example, each signal 400A-400B could include any other or additional contents as needed or desired. In general, a wide variety of signaling is possible over a bus, and FIGS. 4A and 4B do not limit the scope of this disclosure to a particular signaling protocol.

Figure 5:
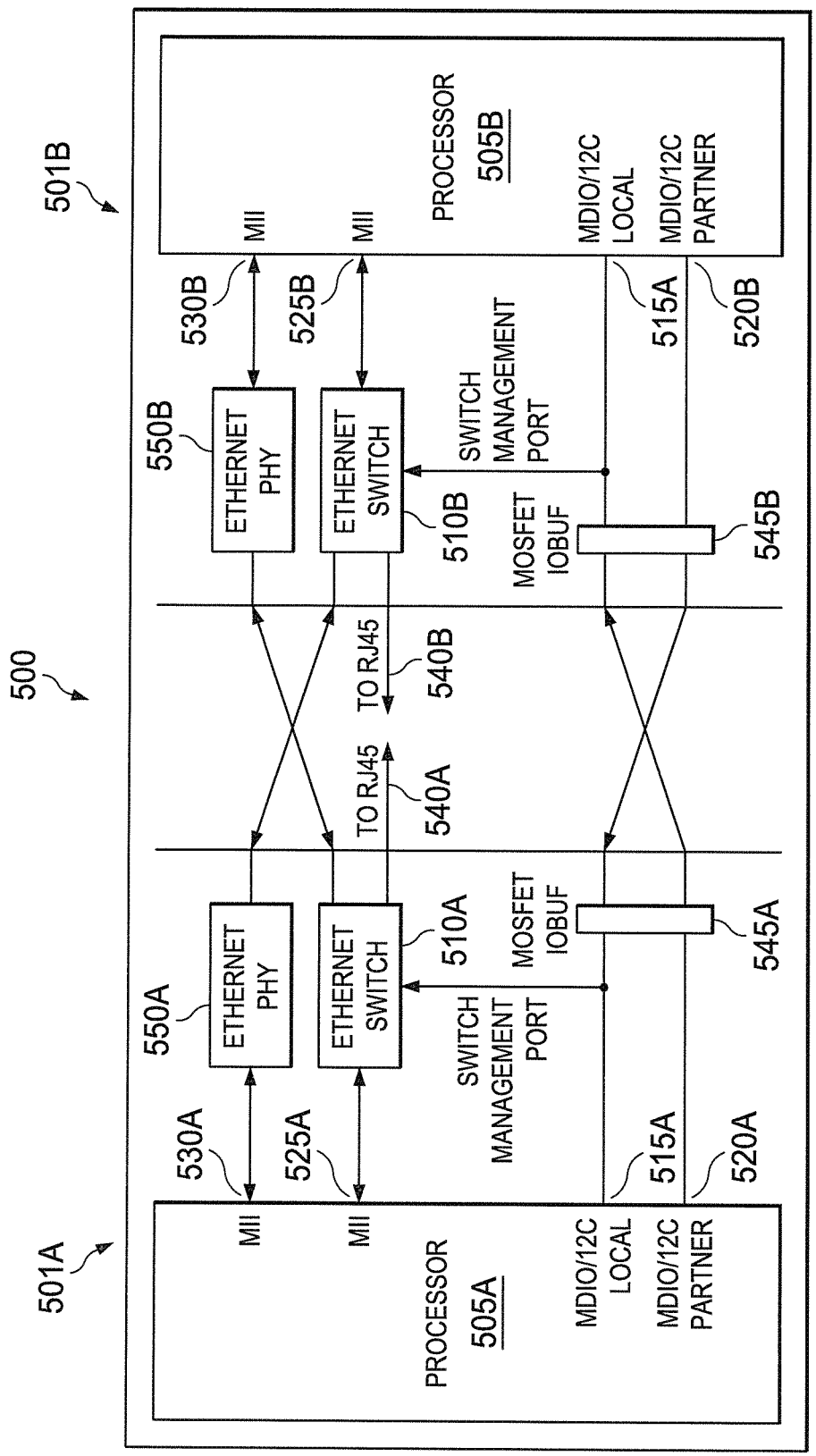
FIG. 5 illustrates an example multi-master system according to this disclosure.

FIG. 5 illustrates an example multi-master system 500 according to this disclosure. As shown in FIG. 5, the system 500 includes multiple master device systems 501A-501B (collectively referred to as master device systems 501). The master device system 501A includes a master device 505A and an Ethernet switch 510A. The master device system 501B includes a master device 505B and an Ethernet switch 510B.

Each master device 505A-505B could include the various components shown in FIG. 2 and described above. The master device 505A also includes an MDIO/I2C local pin 515A, an MDIO/I2C partner pin 520A, and media independent interface (MIT) pins 525A and 530A. The master device 505B includes similar pins 515B-530B. The MDIO/I2C local pin 515A is coupled to the MDIO/I2C partner pin 520B and to the Ethernet switch 510A. The MDIO/I2C local pin 515B is coupled to the MDIO/I2C partner pin 520A and to the Ethernet switch 510B. Metal-Oxide-Semiconductor Field Effect Transistor (MOSFET) Input/Output Buffer (IOBUF) components 545A and 545B regulate the transmission of data between the Ethernet switches 510A and 510B, the MDIO/I2C Local pins 515A and 515B, and the MDIO/I2C partner pins 520A and 520B. Ethernet PHY components 550A and 550B provide a communication channel between MII pins 530A and 530B as well as Ethernet switches 510A and 510B. This arrangement allows each master device 505A-505B to detect the other master device's condition.

The first master device 505A is also communicatively linked at the MII pin 525A to the Ethernet switch 510A and is communicatively linked at the MII pin 530A to the Ethernet switch 510B. The second master device 505B is communicatively linked at the MII pin 525B to the Ethernet switch 510B and is communicatively linked at the MII pin 530B to the Ethernet switch 510A. This arrangement allows the master devices 505A-505B to communicate over different communication links 540A-540B. The communication links 540A-540B represent connections to the bus 115 and allow the master devices 505A-505B to communicate with one or more PHY devices 110.

Although FIG. 5 illustrates one example of a multi-master system 500, various changes may be made to FIG. 5. For example, various components in FIG. 5 could be combined, subdivided, or omitted and additional components could be added according to particular needs. Also, the numbers of master devices shown in FIG. 5 is for illustration only, and the design of each master device is for illustration only. In addition, while shown and described as being used with an Ethernet bus, the multi-master configuration disclosed in this patent document could be used with other types of communication buses.

Figure 6:
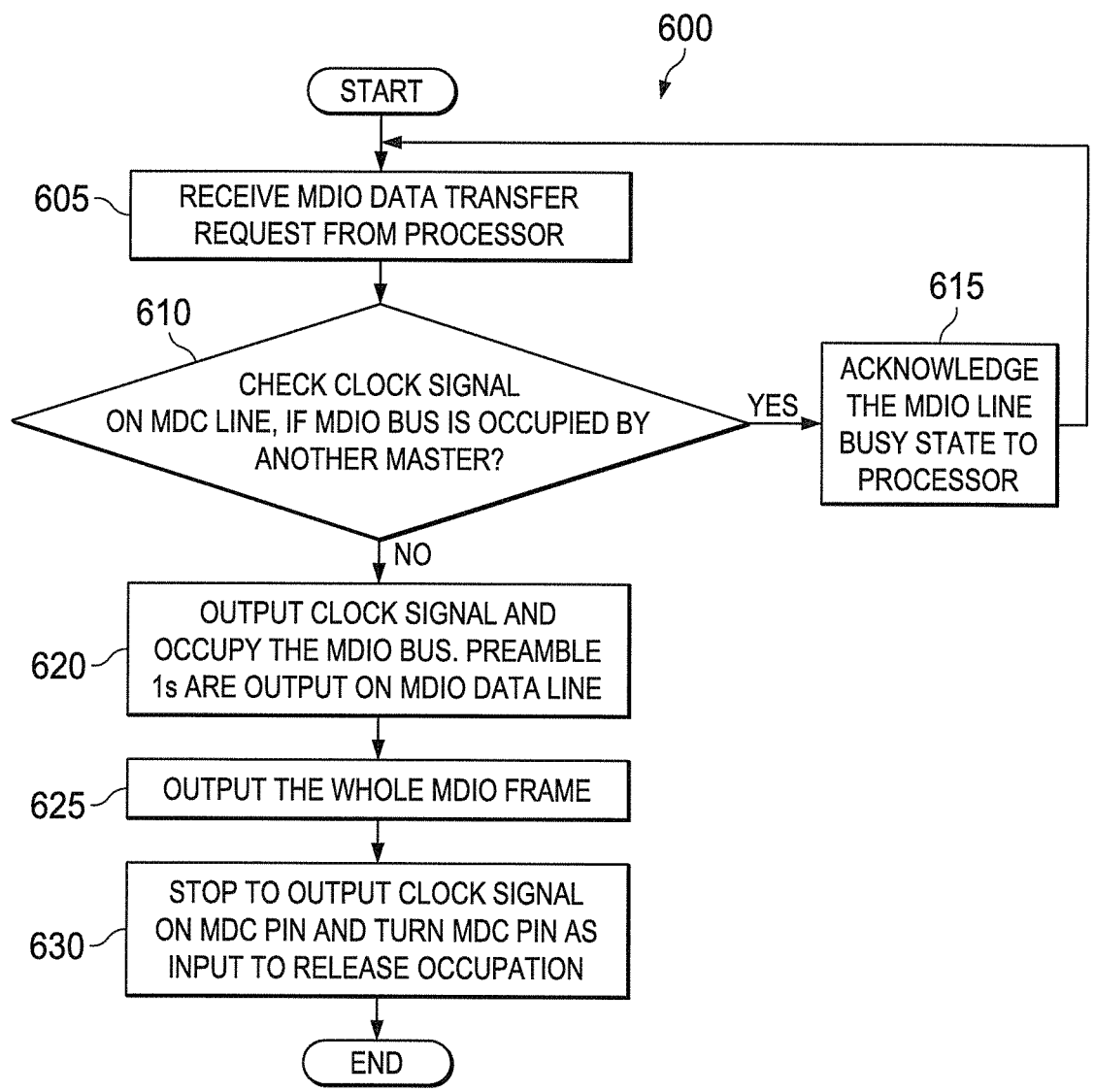
FIG. 6 illustrates an example method for transmitting a signal to one or more devices on a bus system according to this disclosure.

FIG. 6 illustrates an example method 600 for transmitting a signal to one or more devices on a bus system according to this disclosure. As shown in FIG. 6, a data transfer request is received at step 605. This could include, for example, the MDIO control module 205 receiving a data transfer request from a processor or other device. A check is made whether a clock signal is present on an MDC line, indicating that a bus is currently occupied, at step 610. This could include, for example, the clock detector 220 checking whether a valid clock signal appears on the MDC line 120. If so, an acknowledgement is sent that the bus is busy at step 615. This could include, for example, the clock detector 220 sending a "busy" signal to the control module 205, which could inform the processor or other device that data cannot currently be sent.

Otherwise, a clock signal is output and the bus is occupied at step 620. This could include, for example, the control module 205 configuring the drivers 230-235 for outgoing transmissions. This could also include the clock signal generator 225 outputting a clock signal onto the MDC line 120 via the driver 230 and the pin 240. This could further include the control module 205 causing the data shifter 210 to provide a preamble onto the MDIO line 125 via the driver 235 and the pin 245. An MDIO frame is sent over the bus at step 625. This could include, for example, the control module 205 causing the data shifter 210 to provide the remainder of a command, possibly including data to be written to a memory location, onto the MDIO line 125 via the driver 235 and the pin 245. Once the command is completed, the output of the clock signal stops, and the MDC pin is again converted into an input pin at step 630. This could include, for example, the control module 205 configuring the drivers 230-235 for incoming transmissions.

Although FIG. 6 illustrates one example of a method 600 for transmitting a signal to one or more devices on a bus system, various changes may be made to FIG. 6. For example, while shown as a series of steps, various steps in FIG. 6 could overlap, occur in parallel, occur in a different order, or occur any number of times. Also, FIG. 6 could support any combination of the functions described above with respect to FIGS. 1-5.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving, at a first device, a request to transfer data over a Management Data Input/Output (MDIO) communication bus, wherein the first device is configured to generate a first Management Data Clock (MDC) signal;
determining, using an MDC pin of the first device, whether a second MDC signal from a second device is present on the communication bus;
in response to determining that the second MDC signal is not present on the communication bus, transmitting, on the MDC pin of the first device, the first MDC signal and a preamble of an MDIO frame over a MDIO pin to occupy the communication bus, and after transmitting the preamble, transmitting an indicator to indicate a write or read command; and
in response to determining that the second MDC signal is present on the communication bus, refraining from transmitting the first MDC signal, the preamble of the MDIO frame, and the indicator over the communication bus;
reconfiguring the MDC pin to function as an input pin that is able to receive the second MDC signal over the communication bus; and
controlling a first driver to block transmission of the first MDC signal and controlling a second driver to block transmission of at least the part of the MDIO frame until determining that the second MDC signal is not present on the communication bus,
wherein the second driver controls the MDIO pin for bi-directional communication as either an output pin or in input pin.

2. The method of claim 1, further comprising:
stopping transmission of the first MDC signal on the communication bus after transmitting at least the part of the MDIO frame.

3. The method of claim 1, further comprising:
receiving data from a third device over the communication bus as part of the MDIO frame.

4. The method of claim 1, wherein transmitting at least the part of the MDIO frame over the communication bus comprises:
receiving data to be included in the MDIO frame; and
serially shifting the data into the MDIO frame.

5. The method of claim 1, further comprising:
receiving, at the second device, a second request to transfer data over the communication bus;
determining whether the first MDC signal from the first device is present on the communication bus;
in response to determining that the first MDC signal is not present on the communication bus, transmitting the second MDC signal and at least part of a second MDIO frame over the communication bus; and
in response to determining that the first MDC signal is present on the communication bus, refraining from transmitting the second MDC signal and at least the part of the second MDIO frame over the communication bus.

6. An apparatus comprising:
a first device comprising:
a clock generator configured to generate a first Management Data Clock (MDC) signal;
an MDC pin configured to transport the first MDC signal to a communication bus;
a clock detector configured to detect, using the MDC pin, a second MDC signal from a second device on the communication bus; and
a controller configured to:
receive a request to transfer data over a Management Data Input/Output (MDIO) communication bus;
in response to an indication that the second MDC signal is not present on the communication bus, initiate transmission, on the MDC pin, of the first MDC signal and a preamble of an MDIO frame over a MDIO pin to occupy the communication bus, and after transmitting, the preamble, transmitting an indicator to indicate a write or read command; and
in response to determining that the second MDC signal is present on the communication bus, refrain from initiating transmission of the first MDC signal, the preamble of the MDIO frame, and the indicator over the communication bus;
reconfiguring the MDC pin to function as an input pin that is able to receive the second MDC signal over the communication bus;
controlling a first driver to selectively block transmission of the first MDC signal and controlling a second driver to selectively block transmission of at least the part of the MDIO frame until the indication that the second MDC signal is not present on the communication bus; and
controlling, using the second driver, the MDIO pin for bi-directional communication as either an output pin or in input pin.

7. The apparatus of claim 6, wherein the controller is further configured to stop transmission of the first MDC signal on the communication bus after transmission of at least the part of the MDIO frame.

8. The apparatus of claim 6, wherein the controller is further configured to receive data from a third device over the communication bus as part of the MDIO frame.

9. The apparatus of claim 8, further comprising:
a first data shifter configured to receive data to be included in the MDIO frame and to serially shift the data into the MDIO frame; and
a second data shifter configured to receive serial data from the third device.

10. The apparatus of claim 6, further comprising:
the second device, the second device comprising:
a second clock generator configured to generate the second MDC signal;

a second clock detector configured to detect the first MDC signal from the first device on the communication bus; and a second controller configured to:
- receive a second request to transfer data over the communication bus;
- in response to an indication that the first MDC signal is not present on the communication bus, initiate transmission of the second MDC signal and at least part of a second MDIO frame over the communication bus; and
- in response to determining that the first MDC signal is present on the communication bus, refrain from initiating transmission of the second MDC signal and at least the part of the second MDIO frame over the communication bus.

11. The apparatus of claim 10, wherein the first and second devices comprise redundant media access control (MAC) devices.

12. A non-transitory computer readable medium embodying a computer program, the computer program comprising instructions that when executed cause at least one processing device of a first device to:
- receive a request to transfer data over a Management Data Input/Output (MDIO) communication bus, wherein the first device is configured to generate a first Management Data Clock (MDC) signal;
- determine, using an MDC pin of the first device, whether a second MDC signal from a second device is present on the communication bus;
- in response to an indication that the second MDC signal from the second device is not present on the communication bus, initiate transmission, on the MDC pin of the first device, of the first MDC signal and a preamble of an MDIO frame over a MDIO pin to occupy the communication bus, and after transmitting, the preamble, transmitting an indicator to indicate a write or read command; and
- in response to an indication that the second MDC signal from the second device is present on the communication bus, refrain from initiating transmission of the first MDC signal, the preamble of the MDIO frame, and the indicator over the communication bus;
- reconfiguring the MDC pin to function as an input pin that is able to receive the second MDC signal over the communication bus;
- configuring a first driver to block transmission of the first MDC signal and configuring a second driver to block transmission of at least the part of the MDIO frame until the indication that the second MDC signal is not present on the communication bus; and
- controlling, using the second driver, the MDIO pin for bi-directional communication as either an output pin or in input pin.

13. The non-transitory computer readable medium of claim 12, wherein the computer program further comprises instructions that when executed cause the at least one processing device to:
- reconfigure the MDC pin of the first device to function as an output pin that is able to provide the first MDC signal over the communication bus.

14. The non-transitory computer readable medium of claim 12, wherein the computer program further comprises instructions that when executed cause the at least one processing device to stop transmission of the first MDC signal on the communication bus after transmission of at least the part of the MDIO frame.

15. The non-transitory computer readable medium of claim 12, wherein the computer program further comprises instructions that when executed cause the at least one processing device to receive data from a third device over the communication bus as part of the MDIO frame.

16. The method of claim 1, wherein transmitting the first MDC signal and at least part of the MDIO frame over the communication bus comprises transmitting the first MDC signal while the first device is coupled to the second device over the communication bus.

* * * * *